3,113,104
METHOD AND COMPOSITION FOR CONTROL OF FISH ODORS AND ODORS OF PROTEINACEOUS ORIGIN

Frederick C. Bersworth, 120 Washington St., East Orange, N.J.
No Drawing. Filed Nov. 25, 1959, Ser. No. 855,286
2 Claims. (Cl. 252—1)

This invention relates to control of odors originating with fish, fish residues, fish slime and proteinaceous sources.

Odors originating with fish are common and represent a problem which people and establishments handling fish have learned to tolerate, at least to limited degrees. The intense unpleasant odor of putrefying fish, or meat, is usually corrected by use of copious quantities of water and cleansing compositions for washing. At worst, time and ventilation dispose of the last traces.

It has also been observed that cutlery in use on boats or in establishments handling fish is usually of stainless steel, but the corrosive nature of fish residues usually causes development of rust in such equipment.

It is, accordingly, a fundamental object of this invention to provide a method for eliminating such accumulated fish odors and proteinaceous odors, as well as a method and composition suitable for preventing their development to any significant extent in and around equipment and establishments where such materials are handled.

Other objects and advantages of the invention will in part be obvious and in part appear hereinafter.

This invention involves the discovery that sodium benzoate, a well-known compound for use in food preservation, itself odorless and non-toxic in small quantities, may be applied in the inhibition of odor development and for purposes of removal of odors of putrefaction by washing surfaces to which such odor generating materials have adhered with solutions of the benozic acid compounds so as to contact those surfaces with aqueous solutions carrying amounts reaching up to 5 percent or more. In accordance with this operation I have found that the incorporation of about 1 percent of sodium benzoate in water or in detergent solutions used for cleansing purposes in or about a fish boat or fishing establishment will very quickly neutralize, inhibit and remove the odors caused by the accumulation of fish slime in and about the establishment. Similarly, the solution is useful when used in and about an establishment where meat and meat products are handled.

As a separate aspect of the invention I have found that fish and meats when preserved by packing them in ice containing as much as three ounces of the benzoic acid compound per gallon of water frozen will be adequately preserved, because of the refrigeration, and exposed surfaces of such fish and meat will be odorless because of the contact thereof with the benzoate. Accordingly, such benzoated ice represents a new product embodying this aspect of the invention, the ice preferably containing at least about 1 ounce per gallon of water frozen and as much as 3–5 ounces per gallon. It is desirable to have the ice freeze with the benzoate uniformly distributed throughout its crystal structure and, in this, I have found amounts of benzoate from 1–3 ounces per gallon adequate.

In the practice of the invention therefore, compounds which will release benzoic acid ion in solution may be frozen into the ice, which is then used as ordinary ice to pack fish and meat products.

The details of the practice of the invention will be better understood by reference to the following examples:

Example I.—A polystyrene molded plastic box, of a commercial size popular among fishermen for the temporary storage of fishing equipment and fish was used to receive and store several small freshly caught fish, packed in ice, for about a 2 hour period of fishing. The box was not cleaned after the removal of the fish. A day later a small amount of water remaining from the ice which had been packed around the fish and the fish plasma accumulated therein putrefied to give a very strongly odorous container. Cleaners of a variety of compositions were tested, including the full run of conventional domestic household detergents, soap as well as a dishwashing compound for use in electric dishwashers. After a thorough rinsing and scrubbing of the box with each of the conventional detergents it was found that a residual putrefied fish odor clung to the box.

Thereupon a 1 percent aqueous solution of sodium benzoate was used to rinse the box carefully, the amount of solution being approximately one pint in a box having a capacity of about two quarts. A one minute rinse which was then followed by a fresh water rinse to clear the box left it odorless.

Example II.—On a fishing yacht where participants handled fish for several hours during the course of a day's activity it was observed that conventional washing of the hands, even repeated washing with detergents and soap, failed to remove the fish odor completely. It was found thereafter that when the hands were rinsed in 1 percent sodium benzoate solution the odor was completely removed. Likewise it was found that the addition of about 1–5 percent of sodium benzoate to the conventional detergents and powdered soap compositions, whatever the formulation, was effective in making the resultant washing solution odor removing. That is, the effectiveness of the sodium benzoate even in the presence of detergent compositions such as soap and conventional household detergents leaves the detergent effective and also permits the benzoate to neutralize the odor. In general, I have found that about 200 parts of benzoate per part of the detergent materially reduces the residual odor obtained.

Example III.—On the same fishing yacht bilge cleaner was fortified with the addition of ½ percent by weight of sodium benzoate. It was found that the use of the bilge cleaner thus formulated gave a much cleaner bilge area wherein residual odors were neutralized.

Example IV.—A fisherman's outfit, consisting of shirt, slacks and sweater was used a number of times in fishing expeditions and developed the characteristic stale odor associated with such activity. It defied repeated washings in solutions employing the conventional household detergents used for washing purposes. After a wash which left residual odor in the garments, they were rinsed in a ½ percent solution of sodium benzoate. Odor of fish thereupon disappeared. A similar result was achieved when the sodium benzoate was added to the laundry detergent in the original washing of such odorous garments.

Example V.—A liquid dishwashing compound used for washing dishes, on a fishing yacht, to which a persistent odor of fish clung was fortified by the addition of ½ percent of triethanolamine benzoate. The result was that the dishes cleaned using this detergent mixture were efficiently cleaned and the dishes were left odorless.

Example VI.—Dishes were cleaned as in Example V except that the additive used to fortify the detergent was the diester of triethanolamine and benzoic acid.

Apparently the effectiveness of the benzoic acid esters depends upon the hydrolysis of the compound to put some free benzoic acid in the solution. Hence it is apparent that the esters used preferably should be of the alcohols which themselves are not toxic, i.e., ethyl, propyl. However, amounts used are such that methyl alcohol, or other toxic alcohol, could be used since it is lost by drying.

It is a common observation that virtually any solute in water will tend to be frozen out of the solution depositing either on the bottom or the top depending upon the specific gravity of the solute present in the water. I have found that water having in solution about 1½ ounces per gallon of benzoate will freeze to a good uniform solid mass of ice. The ice displays long needles in its structure and, in its clarity, it is not significantly different from ice frozen out of pure water. When this ice is used to preserve freshly caught fish I have found that the fish packed therein will not develop an odor even when stored in such ice for an entire day's expedition.

Experimentally, I have found that ice useful for this preservation of fish may be frozen and have a rather uniform benzoate content even when the benzoate is as high as about three to five ounces per gallon. Accordingly as the second aspect of the invention, it is apparent that ice containing about 1 to 3 or 4 ounces per gallon of the benzoate may be used adequately to preserve fish without the development of the noxious odors of putrefaction so characteristic of such material. Also such ice will form with a degree of clarity and uniformity of dispersal of the benzoate through it which leaves its appearance acceptable to consumers.

From the foregoing description and consideration of the theory of operation it will be apparent that benzoic acid or any of its slightly ionizable salts, esters and like compounds, which give the benzoic acid ion in hydrolysis, are useful for the prevention of the development of fish odors or odors of putrefaction and also for the elimination of such odors from containers wherein they have been developed. It is effective when employed as an additive in detergents to inhibit odor development and to remove developed odors. That is, as a reactant for use in this kind of surface chemistry it is quite useful in removing any such materials causing the odors.

More particularly I have found that benzoic acid, its salts and its esters, will inhibit and remove odors of putrefaction, especially those resulting from the deposition of fish slime on surfaces and those originating with decomposing fish. Whether it be due to the direct action of benzoic acid on the bacteria which produce the enzymes by direct poisoning, or whether it is action on the enzyme by chemical reaction therewith, the effect seems to be that whatever causes degradation of proteins of fish and fish slime is neutralized in the process.

The detergent composition may be used in steam cleaning composition effectively; for example, in a commercial fishing vessel where it is required first to clean the hold and surfaces contacting fish with a detergent, followed by rinse, and again cleaning with water and/or detergent, it was found that a steam sprayed solution containing two grams per gallon of benzoic acid in the form of sodium salt effectively cut the accumulated deposit.

Though the invention has been described with reference to only a few examples, it is to be understood that variants thereof may be developed without departing from its spirit or scope.

What is claimed is:

1. The method of reducing and eliminating odors of putrefaction in and around areas where fish are handled, which comprises wetting surfaces which carry said fish odors with an aqueous solution containing a benzoate compound which will furnish a benzoic acid ion, said compound being selected from the group consisting of alkali metal benzoates, low molecular weight benzoate esters, and alkanol amine benzoate esters, said solution containing about 1–5 percent of said benzoate compound, maintaining said solution in contact with said surfaces, and thereafter rinsing said surfaces with water to free them of said solution.

2. The method in accordance with claim 1 in which the benzoate compound is sodium benzoate.

References Cited in the file of this patent
UNITED STATES PATENTS

| | | |
|---|---|---|
| Re. 21,530 | Kritchevsky | Aug. 13, 1940 |
| 2,027,535 | Jacobson | Jan. 14, 1936 |

FOREIGN PATENTS

| | | |
|---|---|---|
| 13,188 | Great Britain | 1901 |

OTHER REFERENCES

"Antiseptics, Disinfectants, Fungicides and Sterilization," ed. by G. F. Reddish, 2nd edition, published by Lea and Febiger (Philadelphia), 1957, pp. 676–8.